UNITED STATES PATENT OFFICE.

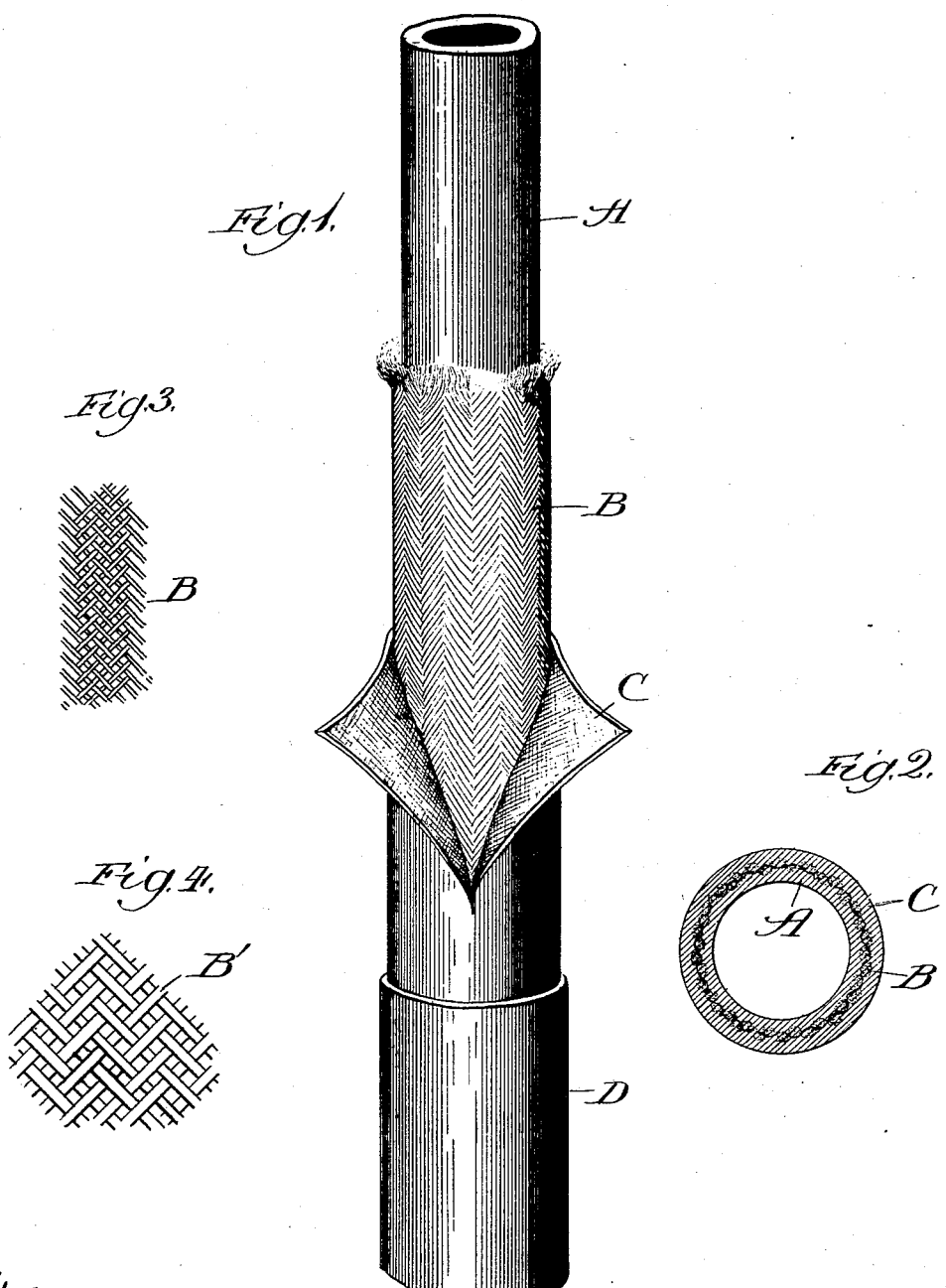

HENRY B. COBB, OF WILMINGTON, DELAWARE, ASSIGNOR TO THE CHICAGO ELECTRIC WIRE COMPANY OF DELAWARE, OF DELAWARE.

RUBBER HOSE.

SPECIFICATION forming part of Letters Patent No. 587,545, dated August 3, 1897.

Application filed February 24, 1896. Renewed December 28, 1896. Serial No. 617,292. (No model.)

*To all whom it may concern:*

Be it known that I, HENRY B. COBB, a citizen of the United States, residing at Wilmington, in the county of New Castle and State of Delaware, have invented a new and useful Improvement in Methods of Manufacturing Rubber Hose, of which the following is a specification.

A usual method heretofore practiced of manufacturing rubber hose of the different kinds adapted for the various purposes to which this article is commonly applied consists in building it up on a mandrel of layers of unvulcanized sheet-rubber and canvas or other suitable fabric and vulcanizing the whole to properly cure the rubber and cement the different layers together. The article thus produced is manufactured, in the main, at least, by hand, involving a slow and comparatively expensive procedure, the result of which is hose which is not satisfactorily durable, since it quickly wears out with ordinary usage; and when such hose has once started to wear, as by a hole being worn through or partly through it, fluid forced through it tends to separate the layers from each other by forcing itself between them, and thus soon destroys the usefulness of the hose. Moreover, the length in which hose so manufactured can be provided is limited by the length of mandrel employed in its manufacture, which by reason of its unwieldiness rarely is longer than from, say, fifty to sixty feet.

My invention relates to an improvement in the manufacture of rubber hose; and my object is to provide a novel method of manufacture wherein all the steps are performed by machinery for producing an article of rubber hose which shall be exceptionally durable and so elastic that any kink or bend in it will automatically straighten itself out, the method permitting the article to be manufactured in very great continuous lengths, thus in hundreds of feet, in which to furnish it to dealers, who may thus cut off and supply therefrom to their customers any lengths they may desire, which could not be done with the ordinary hose lengths hitherto provided to dealers without rendering the remainder more or less unsalable.

To practice my improved method, I first form of rubber which is unvulcanized but prepared for vulcanization a tube in any desired length, say five hundred feet or more. This may readily be done by the use of a well-known rubber-tube-forming machine in which the prepared rubber stock is fed to dies, from which it emerges as tubing and is received and coiled upon a suitable holder. Upon this rubber tubing I provide a fabric covering of fibrous material, as hemp or similar cord, or of metal strips or ribbon, braided or woven, but preferably braided in open-work about the exterior surface of the tubing, which in its covered condition is again coiled upon a suitable reel as it emerges from the braiding-machine. I then apply about this covered tubing a covering of rubber prepared for vulcanization and preferably in the form of sheet-rubber, and the product thus formed is thereupon passed through a lead-press, such as that set forth in Letters Patent of the United States No. 515,951, granted to me on the 6th day of March, 1894, whereby it is incased in a sheath of lead. In fact it is my practice and I prefer to apply the sheet-rubber covering to the fabric-covered rubber tubing as it is being fed lengthwise through the lead-press, since thereby the edges of the sheet-rubber, which should be just wide enough to form the envelop with its edges meeting, are united with an imperceptible junction by the heat in the press. It is also desirable by way of preventing the fabric-covered tubing from collapsing in passing through the lead-press to maintain within it an adequate pressure of air or other suitable fluid expansible under the influence of heat, as it is my practice to do, for the effect of the counter-pressure of the fluid in forcing the substance of the confined layers of rubber between the interstices of the fabric, and thus uniting the whole into an integral mass. As the lead-covered product emerges from the lead-press it should be coiled about a metal reel, and it is then subjected to vulcanization according to any suitable process, that which I prefer to practice involving the confinement of the reeled lead-covered article in a steam vulcanizing-oven, with air or other suitable fluid at high pressure (say fifty pounds to the square inch) confined inside the tubing, whereby the vulcanizing heat in the oven greatly expands the fluid, which accordingly subjects the rubber and interposed fabric of the tubing to great pressure against the resistance of the lead sheath and firmly unites through the interstices of the fabric the separate rubber portions of the hose and incorporating therein the fabric. Thus the different parts of the hose are united in a single body composed of inseparable mutually-incorporating parts, whereby the article is rendered very strong and durable.

As will be understood, any desired number of alternate layers of rubber and fabric may be employed, depending upon the size and character of hose to be produced.

After the vulcanizing treatment has been completed the lead-covered coil is removed from the vulcanizing medium, and after the confined air has been released (as by cutting off an end of the coiled article) the lead covering is taken off. A convenient way of removing the lead sheath is to run the article lengthwise through the stripping-machine for which Letters Patent No. 429,292 were granted June 3, 1890, to Duncan Thatcher, and from this machine the finished hose may be wound upon a reel, ready for storage or shipment.

In the accompanying drawings I have illustrated my improved method by showing the article in the successive stages of its production.

Thus Figure 1 is a diagrammatic view in elevation, showing the rubber tubing A, a portion of the tubing surrounded by an open-work fabric covering B of braided fibrous material, a portion of the braid-covered tubing covered with sheet-rubber C, the view indicating the manner of applying to the fabric-covered tubing the sheet-rubber covering, and a portion of the sheet-rubber covering on the article after it has passed through a lead-press and received its covering D of lead. Fig. 2 is a cross-section of the completed article of hose after its vulcanization in the lead sheath, which has thereupon been stripped off; Fig. 3, an enlarged view of a section of the braided covering of fibrous material, showing the mesh exaggerated to present its open-work character more clearly than in Fig. 1; and Fig. 4 is a similar view of a modification, showing the braid (denoted B') as formed of ribbon or very thin strips of sheet metal.

In addition to its purpose as hose the product of my improved method is intended for use in bicycle and other vehicle tires, to adapt it for which purpose the braided metal covering B' is more especially provided, and to make tires out of the hose it need but be cut into proper lengths, which, when their ends are joined together and after they have been equipped with suitable air-valves, if desired, may be applied to the rims of the wheels adapted to receive them.

As will be seen from the foregoing specification, my invention consists, broadly, in forming about a tube of alternate layers of rubber and fabric an inelastic mold and maintaining within the tube during the molding operation a counter-pressure of expansible fluid; also in subjecting the mold-covered product to vulcanization and finally removing the mold, these latter steps being also taken while the counter-pressure of expansible fluid continues within the tube. In the vulcanization the mold-covered product is subjected to heat, which causes the expansion of the fluid within the tubing and tends to expand the latter; but this is resisted by the inelastic mold, with the result that the layers of rubber are forced together into intimate union through the interstices of the fabric. The presence of the internal pressure within the tube during the molding operation and also of the pressure exerted externally by the mold itself has the tendency to exclude from between the tube and the mold all air which would ordinarily be confined therein, the result being the avoidance of any inequalities in the surface of the finished product.

What I claim as new, and desire to secure by Letters Patent, is—

1. The method of manufacturing rubber hose, which consists in forming about a tube of alternate layers of rubber and fabric an inelastic mold and maintaining inside the tubing a counter-pressure of expansible fluid during the molding operation, then subjecting the mold-covered product to vulcanization and finally removing the mold.

2. The method of manufacturing rubber hose, which consists in molding about a tube of alternate layers of rubber and fabric a covering of lead and maintaining inside the tubing a counter-pressure of expansible fluid during the molding operation, then subjecting the lead-covered product to vulcanization and finally removing the lead covering.

3. The method of manufacturing rubber hose, which consists in forming about a tube of alternate layers of rubber and fabric an inelastic mold and maintaining inside the tubing a counter-pressure of expansible fluid during the molding operation, then subjecting the mold-covered product to heat and finally removing the mold.

4. The method of manufacturing rubber hose, which consists in molding about a tube of alternate layers of rubber and fabric a covering of lead and maintaining inside the tubing a counter-pressure of expansible fluid during the molding operation, then subjecting the lead-covered product to heat and finally removing the lead covering.

5. The method of manufacturing rubber hose, which consists in making rubber tubing by forcing rubber, prepared for vulcanization, through tube-forming dies, forming about said tubing an open-work covering, then incasing said covered tubing in unvulcanized rubber, forming about the whole an inelastic mold, and maintaining inside the tubing, during the molding operation, a counter-pressure of expansible fluid, then subjecting the mold-covered product to vulcanization and finally removing the mold, substantially as described.

6. The method of manufacturing rubber hose, which consists in making rubber tubing by forcing rubber, prepared for vulcanization, through tube-forming dies, forming about said tubing an open-work covering and covering it with sheet-rubber, then molding about the whole a covering of lead, and maintaining inside the tubing, during the molding operation, a counter-pressure of expansible fluid subjecting the lead-covered product to vulcanization and finally removing the lead covering, substantially as described.

7. The method of manufacturing rubber hose, which consists in forming about unvulcanized rubber tubing an open-work covering, then incasing said covered tubing in unvulcanized rubber, molding about the whole a covering of lead and maintaining inside the tubing a counter-pressure of expansible fluid during the molding operation, then subjecting the lead-covered product to vulcanization and finally removing the lead covering, substantially as described.

8. In the manufacture of rubber hose composed of alternate layers of rubber and fabric, the method of forming a tubular layer of the rubber, which consists in passing sheet-rubber through a former and uniting the edges of the rubber sheet by heat, while so forming it into tubing.

9. A step in the art of manufacturing rubber hose which consists in forming about a tube of alternate layers of rubber and fabric an inelastic mold, and maintaining during the molding operation a counter-pressure of expansible fluid.

HENRY B. COBB.

In présence of—
CHARLES H. SASSE,
WILLIAM A. PORTER.